(No Model.)
J. B. SLADE.
PAIL HANDLE.
No. 566,028.  Patented Aug. 18, 1896.
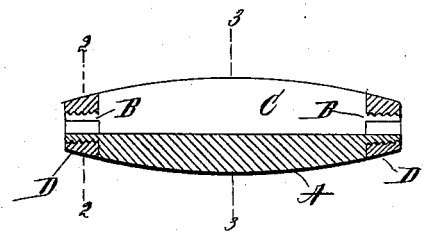
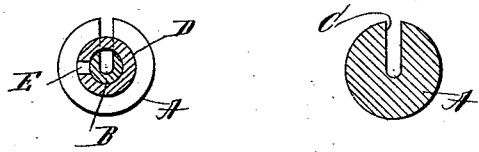
WITNESSES
INVENTOR
James B. Slade
BY
Edgar Tate & Co
ATTORNEYS

UNITED STATES PATENT OFFICE.

JAMES BARTHOLOMEW SLADE, OF RIVERHEAD, NEW YORK.

PAIL-HANDLE.

SPECIFICATION forming part of Letters Patent No. 566,028, dated August 18, 1896.

Application filed June 11, 1896. Serial No. 595,139. (No model.)

*To all whom it may concern:*

Be it known that I, JAMES BARTHOLOMEW SLADE, a citizen of the United States, and a resident of Riverhead, in the county of Suffolk and State of New York, have invented certain new and useful Improvements in Pail-Handles, of which the following is a specification, reference being had to the accompanying drawings, forming a part thereof, in which similar letters of reference indicate corresponding parts.

This invention relates to handles for kettles, pails, pots, and other vessels, and the object thereof is to provide an improved handle which may be connected with or detached from the bail of such vessels whenever desirable, a further object being to provide a detachable handle or grip for bails of various kinds of vessels and also for hand-irons and other and similar articles.

The invention is fully disclosed in the following specification, of which the accompanying drawings form a part, in which—

Figure 1 is a longitudinal central section of my improved handle; Fig. 2, a section on the line 2 2, and Fig. 3 a section on the line 3 3.

In the practice of my invention I provide a handle A, which is provided at each end with a cylindrical screw-threaded extension B, and I also form in said handle and in said longitudinal screw-threaded extension a longitudinal slot C, which extends to and past the longitudinal center of the handle, and mounted on each of said screw-threaded extensions B is a revoluble nut or bur D, each of which is also provided in one side thereof with a slot E, which corresponds with and which is adapted to register with the slot C.

In connecting this handle with a bail it is only necessary to turn the nuts or burs D so that the slots E therein will register with the slot C, and then insert the bail through said slots, and then by turning said nuts or burs so that the slots E will not register with the slot C the handle will be securely held in position on the bail, and it will be apparent that the handle may be detached from the bail by reversing this operation whenever desired.

The handle A may be composed of any desired material, and is preferably of the form shown in the drawings, being largest at the middle and tapered to both ends.

It will thus be seen that I accomplish the object of my invention by means of a device which is simple in construction and which is comparatively inexpensive, and it is evident that changes in and modifications of the construction herein described may be made without departing from the spirit of my invention or sacrificing its advantages.

Having fully described my invention, I claim as new and desire to secure by Letters Patent—

1. A handle for the bails of kettles, pots and other articles, composed of a body portion, having a longitudinal slot formed therein, said body portion being provided with a screw-threaded extension at each end, which is also slotted in the same manner, and nuts or burs mounted on said screw-threaded extension, provided with slots adapted to register with the slot in the handle, and in the screw-threaded extensions, substantially as shown and described.

2. A handle for the bails of kettles, pots and other articles, which consists of a body portion, having a longitudinal slot in one side thereof, which extends to, and past the longitudinal center of the handle, said body portion being provided at each end with a screw-threaded extension, which is similarly slotted, said screw-threaded extensions being each provided with a nut or bur, having a slot in one side thereof, adapted to register with the slot in the handle and the extensions, substantially as shown and described.

In testimony that I claim the foregoing as my invention I have signed my name, in presence of the subscribing witnesses, this 30th day of May, 1896.

JAMES BARTHOLOMEW SLADE.

Witnesses:
NAT. W. FOSTER,
WILLIS L. FURRY.